(12) United States Patent
Meng et al.

(10) Patent No.: US 11,057,562 B2
(45) Date of Patent: Jul. 6, 2021

(54) MULTI-MODE CMOS IMAGE SENSOR AND CONTROL METHOD THEREOF

(71) Applicants: CAPITAL NORMAL UNIVERSITY, Beijing (CN); CHINAMAP HI-TECH (BEIJING) INFORMATION TECHNOLOGY CO., LTD., Beijing (CN)

(72) Inventors: Guanjia Meng, Beijing (CN); Huili Gong, Beijing (CN); Xiaojuan Li, Beijing (CN); Ruofei Zhong, Beijing (CN); Jiao Guo, Beijing (CN); Cankun Yang, Beijing (CN)

( * ) Notice: Subject to any disclaimer, the term of this patent is extended or adjusted under 35 U.S.C. 154(b) by 0 days.

(21) Appl. No.: 15/771,384

(22) PCT Filed: Dec. 13, 2016

(86) PCT No.: PCT/CN2016/109663
§ 371 (c)(1),
(2) Date: Apr. 26, 2018

(87) PCT Pub. No.: WO2018/049738
PCT Pub. Date: Mar. 22, 2018

(65) Prior Publication Data
US 2019/0058831 A1 Feb. 21, 2019

(30) Foreign Application Priority Data
Sep. 13, 2016 (CN) .......................... 201610822278.6

(51) Int. Cl.
*H04N 5/232* (2006.01)
*H04N 5/353* (2011.01)
*H04N 5/341* (2011.01)
*H04N 17/00* (2006.01)

(52) U.S. Cl.
CPC ....... *H04N 5/23245* (2013.01); *H04N 5/3415* (2013.01); *H04N 5/3535* (2013.01); *H04N 17/002* (2013.01)

(58) Field of Classification Search
CPC ... H04N 5/23245; H04N 5/374; H04N 5/3741
See application file for complete search history.

(56) References Cited

U.S. PATENT DOCUMENTS

| 7,710,485 B2 * | 5/2010 | Oshima .............. H04N 5/23245 348/223.1 |
| 2002/0135390 A1 | 9/2002 | Fujii et al. |

(Continued)

FOREIGN PATENT DOCUMENTS

| CN | 1363042 A | 8/2002 |
| CN | 1645859 A | 7/2005 |

(Continued)

OTHER PUBLICATIONS

ISR from PCT application PCT/CN2016/109663, dated May 10, 2017, 2 pages.

(Continued)

*Primary Examiner* — Gevell V Selby
(74) *Attorney, Agent, or Firm* — W&K IP

(57) ABSTRACT

The present invention discloses a multimode CMOS image sensor and a control method thereof. The sensor comprises an independent control area group, a peripheral control circuit, a section mode setting module and a section mode configuration module. The method comprises dividing an independent control area group of the sensor into sections; setting a mode for each of the sections obtained; configuring a control mode of the peripheral control circuit for a corresponding section according to the mode set. By means of the present invention, when imaging in a push-broom mode, a regular sequence of images with fixed pixel difference can be produced at high frequency, and by performing pixel (Continued)

unmixing or integrating on the images obtained, the resolution and signal-to-noise ratio of the images can be effectively increased; because it is possible for some image unit area(s) of the sensor not to be selected as a scanning area, such design can bypass image units with quality issues when imaging by the hardware, which increases the reliability of the device; the characteristic of multiple times of imaging for the same target within very short time by multiple channels of the device can be utilized to realize moving target detection of optical camera imaging.

9 Claims, 4 Drawing Sheets

(56) References Cited

U.S. PATENT DOCUMENTS

| | | | |
|---|---|---|---|
| 2005/0157192 A1 | 6/2005 | Hosier et al. | |
| 2013/0208154 A1* | 8/2013 | Wang | H04N 5/3575 348/280 |
| 2013/0342229 A1 | 12/2013 | Wang | |
| 2014/0253615 A1 | 9/2014 | Shelby | |
| 2015/0109515 A1* | 4/2015 | Kobuse | H04N 5/23212 348/349 |
| 2018/0249110 A1* | 8/2018 | Kobayashi | H04N 5/37457 |

FOREIGN PATENT DOCUMENTS

| | | |
|---|---|---|
| CN | 1645895 A | 7/2005 |
| CN | 101330577 A | 12/2008 |
| CN | 101854489 A | 10/2010 |
| CN | 202486043 U | 10/2012 |
| CN | 102801893 A | 11/2012 |
| CN | 103018259 A | 4/2013 |
| CN | 103513477 A | 1/2014 |
| JP | 2009238202 A | 10/2009 |

OTHER PUBLICATIONS

First Office Action of Chinese Application No. 201610822278.6.
Second Office Action of Chinese Application No. 201610822278.6.

* cited by examiner

MULTI-MODE CMOS IMAGE SENSOR AND CONTROL METHOD THEREOF

CROSS REFERENCE TO RELATED APPLICATIONS

This application is a national stage application under 35 U.S.C. 371 and claims the benefit of PCT Application No. PCT/CN2016/109663 having an international filing date of Dec. 13, 2016, which designated the United States, which PCT application claimed the benefit of Chinese Patent Application No. 201610822278.6, filed Sep. 13, 2016, the disclosure of each of which are incorporated by reference herein.

TECHNICAL FIELD

The present invention relates to an image sensor and a control method thereof, in particular relates to a CMOS image sensor and a control method thereof

BACKGROUND

A CMOS image sensor is a Complementary Metal Oxide Semiconductor sensor, which is an image sensor having a photosensor, an amplifier, an A/D convertor, a memory, a digital signal processor and a computer interface circuit integrated on one silicon chip. This sensor does not need complicated processing and can directly convert electrons generated by the image semiconductor into voltage signal at very high speed. This advantage makes the CMOS sensor very effective for high-frequency imaging.

However, most CMOS sensors only has a single push-broom working mode or a single push-frame working mode, and can only produce a single image, and once a point in the image unit array becomes damaged, the damaged point is irreplaceable. A highly reliable CMOS, which has both push-broom function and push-frame function mutually switchable, can produce a regular image sequence at high frequency, and can effectively bypass a damaged image unit, has not yet been produced. In consideration of this, we provide a multi-functional sensor having both push-broom imaging mode and push-frame imaging mode.

Push-broom imagers are also sometimes called along-track scanners, wherein a sensor in use is placed perpendicular to a flying direction of a spacecraft, and when the spacecraft flies forward, a row of images can be collected at a time. Push-frame imaging is collecting a sequence of area array images in the flying direction of the spacecraft.

SUMMARY OF THE INVENTION

A technical problem to be solved by the present invention is how to provide a multimode CMOS image sensor that can realize independent image collecting in divided sections and can carry out multiple imaging modes, as well as a control method thereof.

In order to solve the above-mentioned technical problem, the present invention adopts the following technical scheme:

A multimode CMOS image sensor is provided to comprise an independent control area group, in which each independent control area has an image sensitive unit row and an independent control circuit; a peripheral control circuit, for performing row-selection driving on the image sensitive unit rows and providing working time-sequence to the image sensitive unit rows; a section mode setting module, for performing section dividing on the independent control areas and performing mode setting on the divided sections; a section mode configuration module connected to the section mode setting module, the peripheral control circuit and the independent control circuits, for configuring a control mode of the peripheral control circuit and the independent control circuit for a corresponding section according to a mode set by the section mode setting module.

Furthermore, the mode is any one of a push-broom mode, a push-frame mode and a disabled mode.

Furthermore, the sensor also comprises a damaged image unit detection module connected to signal output ports of the independent control areas, and a damaged image unit report module connected to the damaged image unit detection module, wherein, the damaged image unit detection module is for detecting whether an image sensitive unit array contains a damaged image sensitive unit and detecting a location of the damaged image sensitive unit in the image sensitive unit array according to data outputted from the sensor; the damaged image unit report module is for reporting that the image sensitive unit array contains a damaged image sensitive unit and reporting the location of the damaged image sensitive unit to an operator.

Furthermore, when the section mode configuration module configures a section to work in a push-broom mode, a row-selection control circuit is instructed to sequentially select image sensitive unit rows in the section for connection, configure all the image sensitive unit rows in the section to have the same scanning frequency, and choose an output circuit of one independent control area in the section to be the output circuit for the entire section.

Furthermore, when the section mode configuration module configures a section to work in a push-frame mode, a row-selection control circuit is instructed to simultaneously select all image sensitive unit rows in the section for connection, configure all the image sensitive unit rows in the section to have the same sampling time and frequency, and choose an output circuit of one independent control area in the section to be the output circuit for the entire section.

Furthermore, when the section mode configuration module configures a section to work in a disabled mode, all image sensitive unit rows in the section of independent control area are no longer selected for connection by a row-selection control circuit.

Furthermore, the independent control area group is divided into a first section, a second section and a third section along a column direction, wherein, the first and third sections work in a push-broom mode, and the second section works in a push-frame mode.

A control method for a multimode CMOS image sensor is provided to comprise the steps of dividing an independent control area group of the sensor into sections; setting a mode for each of the sections obtained; configuring a control mode of the peripheral control circuit for a corresponding section according to the mode set.

Furthermore, the mode is any one of a push-broom mode, a push-frame mode and a disabled mode.

Furthermore, before any section is set to be in the disabled mode, the method comprises the steps of detecting whether the respective sections contain a damaged image sensitive unit according to image signal outputted from the respective sections, and determining the location of the damaged image sensitive unit if the damaged image sensitive unit exists; when a damaged image sensitive unit is detected, reporting the existence of a damaged image sensitive unit and the location thereof.

As compared to the prior art, the technical scheme of the present invention has the following advantages:

A first advantage is that, when imaging in a push-broom mode, a regular sequence of images with fixed pixel difference can be produced at high frequency, and by performing pixel unmixing or integrating on the images obtained, the resolution and signal-to-noise ratio of the images can be effectively increased; a second advantage is that, because it is possible for some image unit area(s) of the sensor not to be selected as a scanning area, such design can bypass image units with quality issues when imaging by the hardware, which increases the reliability of the device; a third advantage is that, the characteristic of multiple times of imaging for the same target within very short time by multiple channels of the device can be utilized to realize moving target detection of optical camera imaging, which provides a novel method for moving target detection.

BRIEF DESCRIPTION OF THE DRAWINGS

Various other advantages and benefits would become clear to a person skilled in the art by reading the detailed description of preferred embodiments hereinafter. The appended drawings is only intended for the purpose of illustrating the preferred embodiments, and should not be considered as limitations to the present invention. And in all the drawings, the same reference signs are used to represent the same components. In the drawings.

DETAILED DESCRIPTION OF EMBODIMENTS

Hereinafter, illustrative embodiments of the present disclosure are described in more detail with reference to the appended drawings. Although the illustrative embodiments of the present disclosure are shown in the appended drawings, it should be understood that, the present disclosure may be implemented in various forms, not limited by the embodiments illustrated herein. On the contrary, providing these embodiments is for being able to make the present disclosure more thoroughly understood and for being able to completely convey the scope of the present disclosure to a person skilled in the art.

Figure 1:
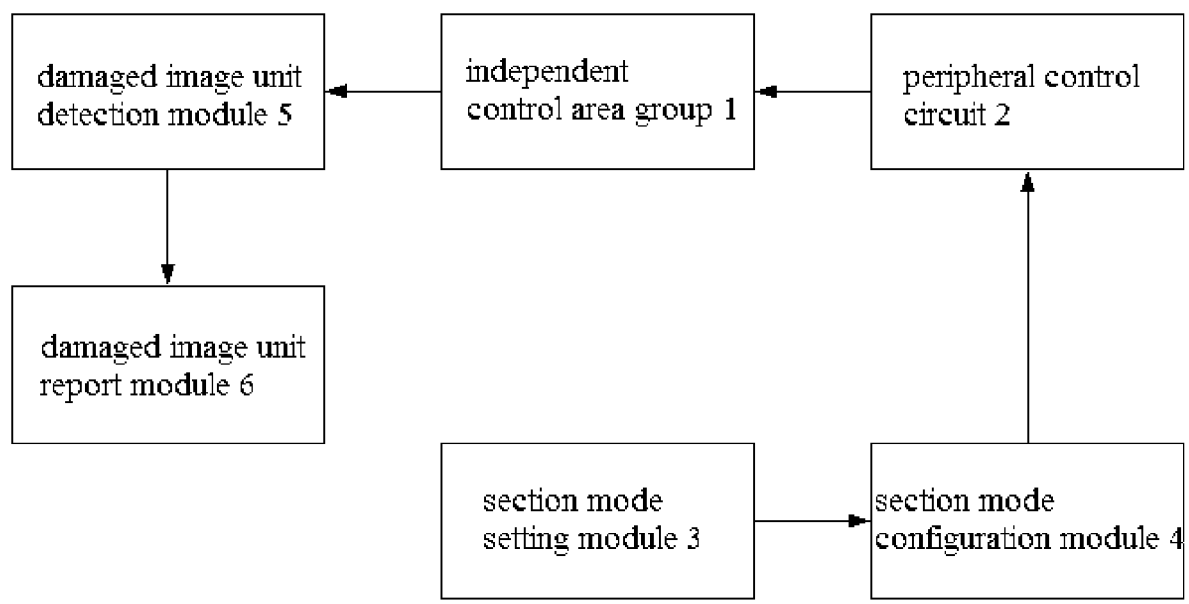
FIG. 1 is an overall structural schematic diagram of a multimode CMOS image sensor according to an embodiment of the present invention.

As shown in FIG. 1, a multimode CMOS image sensor of the present invention comprises an independent control area group 1 consisting of a plurality of independent control areas, and a peripheral control circuit 2.

In an embodiment of the present invention, for an image sensitive unit array on the multimode CMOS image sensor, an independent area control circuit is provided for every n rows of image sensitive units, where n is an integer larger than or equal to 1, that is to say, each independent control area has n rows of image sensitive units and a corresponding independent area control circuit. Alternatively, in another embodiment, independent control areas with different sizes exist in the image sensitive unit array, for example, every 2 rows from the first 8 rows of image sensitive units have an independent area control circuit, the middle 128 rows of image sensitive units have a common independent area control circuit, and every 1 row from the last 16 rows of image sensitive units has an independent area control circuit.

Figure 2:
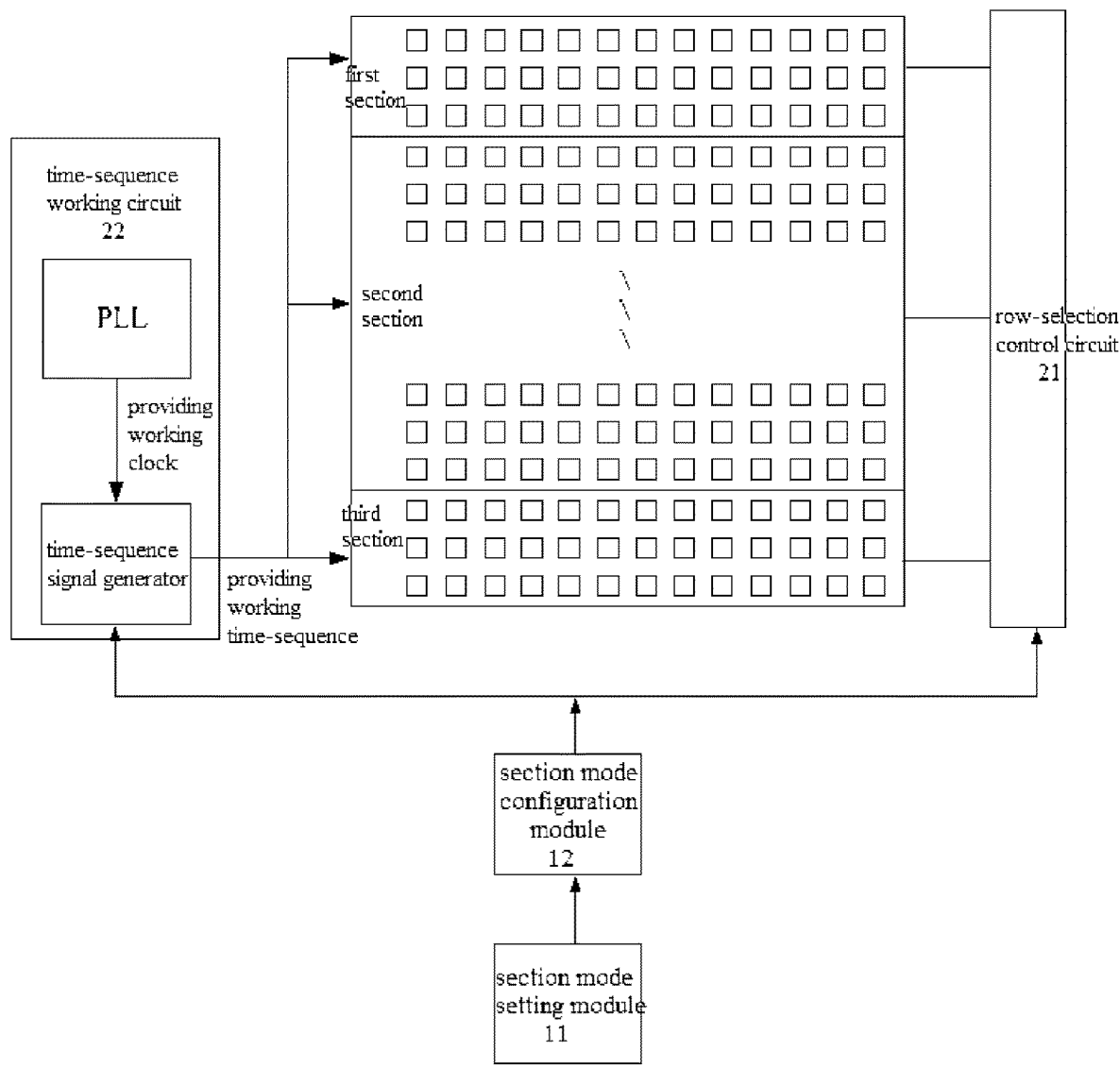
FIG. 2 shows a specific structure of the peripheral control circuit in FIG. 1 and its connection relation with the section mode configuration module.

As shown in FIG. 2, the peripheral control circuit 2 comprises a row-selection control circuit 21 and a time-sequence working circuit 22. Wherein, the row-selection control circuit 21 is for providing working pulses for the respective rows of the entire image sensitive unit array; the time-sequence working circuit 22 is for providing independent working time-sequence for the respective rows of the image sensitive unit array, and comprises a phase-locked loop (PLL) circuit and a time-sequence signal generator connected to the PLL circuit.

Figure 3:
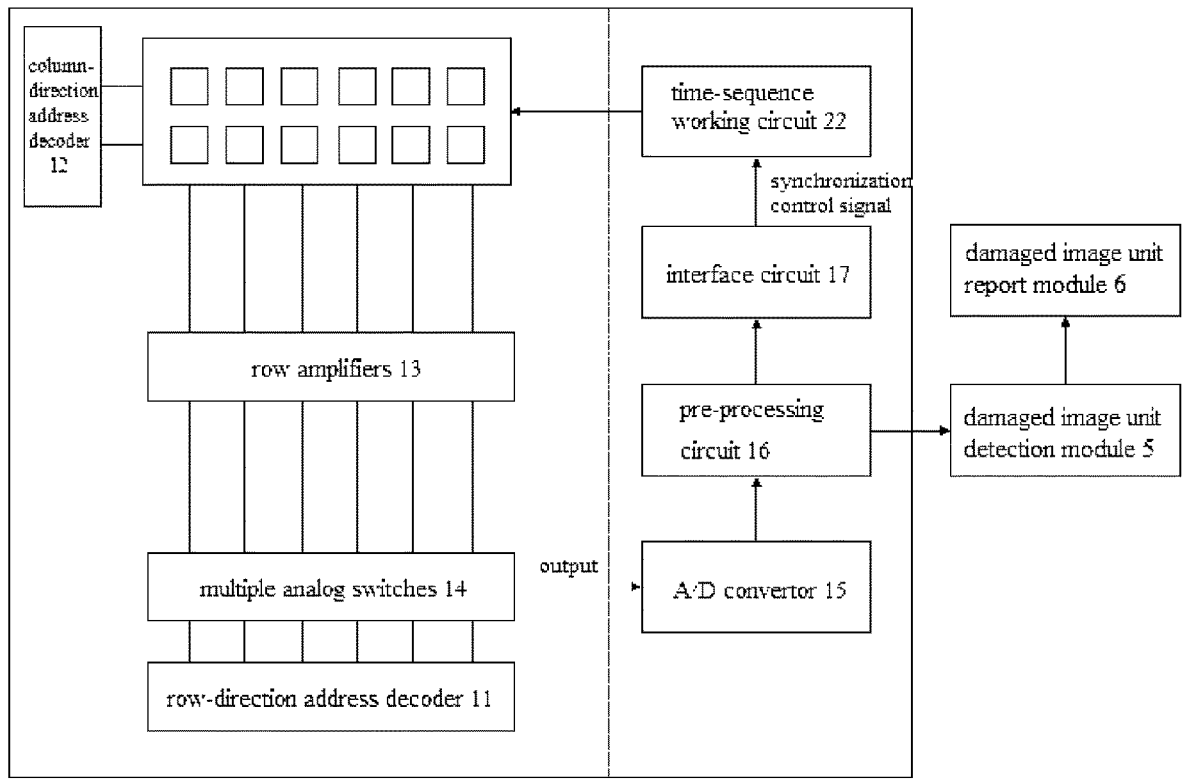
FIG. 3 shows a structure of an independent area control circuit according to an embodiment of the present invention.

As shown in FIG. 3, the independent area control circuit comprises a row-direction address decoder 11 and a column-direction address decoder 12, the image sensitive units in an independent control area are arranged in rows and columns to form an array, each image sensitive unit in the independent control area has a row address and a column address, the column-direction address decoder 12 is for converting an address selection command from the row-selection control circuit 21 into a drive signal of a selected row, the row-direction address decoder 11 is for converting a selection output command from the time-sequence working circuit 22 into an output drive signal of a selected image sensitive unit. The independent area control circuit also comprises column amplifiers 13 connected to the respective image sensitive unit rows in the independent control area, multiple analog switches 14 connected to the column amplifiers 13, a row-direction address decoder 11 connected to the multiple analog switches 14, an A/D convertor 15 connected to serial output ports of the multiple analog switches 14, a pre-processing circuit 16 connected to the A/D convertor 15, an interface circuit 17 connected to the pre-processing circuit 16, and a time-sequence working circuit 22 connected to the interface circuit 17. Every image sensitive unit in the independent control area can be selected by the row-direction address decoder 11 and the column-direction address decoder 12. Each column of image sensitive units correspond to a column amplifier 13, the output signals of the column amplifiers 13 are respectively connected to the multiple analog switches 14 which are selected by the row-direction address decoder 11, and are then outputted to an output amplifier; the output signal of the output amplifier is sent to the A/D convertor 15 for analog-digital converting, processed by the pre-processing circuit 16, and then outputted through the interface circuit 17. Wherein, the time-sequence working circuit 22 provides various working pulses for the entire CMOS image sensor, and these pulses can all be controlled by synchronization control signal sent from the interface circuit 17.

Figure 4:
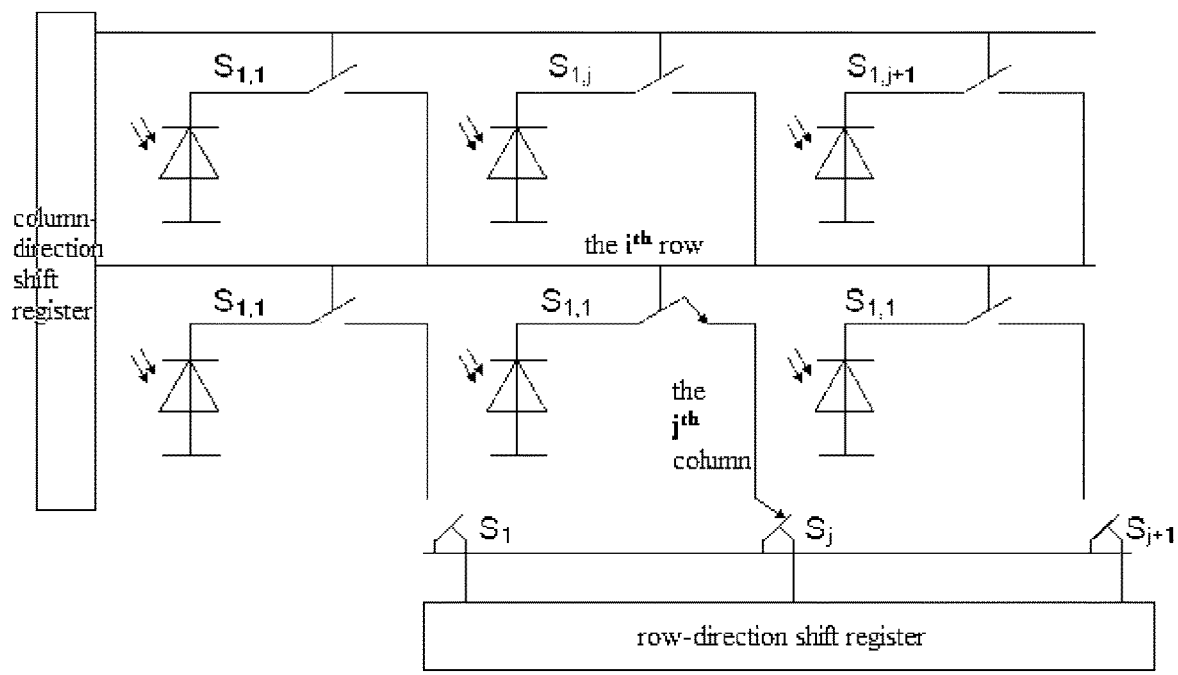
FIG. 4 is a schematic diagram of image signal output.

The output process of image signal can be illustrated by a schematic diagram of the image sensor array. As shown in FIG. 4, as controlled by the column-direction address decoder 12, analog switches 14 on each image sensitive unit row is switched on sequentially, so that the signals are transmitted onto the column lines through the row switches 14 and then, as controlled by the row-direction address decoder 11, transmitted to the amplifiers 13. Because row switches and column switches are provided, the switching on of which is controlled by digital signals applied to address decoders along two directions, therefore, by working in a manner of shift registers along both the row direction and the column direction, an output mode of line-by-line scanning or interlaced scanning can be realized; by only outputting signal of one certain row or one certain column, it can be configured to work in a manner similar to a line array CCD (charge-coupled device); signal of certain pixel points can also be selected to be observed, for example, signal of the $i^{th}$ row, the $j^{th}$ column as shown in FIG. 4.

In order to realize independent image collecting in divided sections and/or multiple modes of image collecting, as shown in FIG. 1, the multimode CMOS image sensor comprises an independent control area group 1 consisting of a plurality of independent control areas, wherein each independent control area has image sensitive unit row(s) and an independent control circuit; a peripheral control circuit 2, for performing row-selection driving on the image sensitive unit rows and providing working time-sequence to the image sensitive unit rows; a section mode setting module 3, for performing section dividing on the independent control areas and performing mode setting on the divided sections; and a section mode configuration module 4 connected to the section mode setting module 3, the peripheral control circuit 2 and the independent control circuits, for configuring a control mode of the peripheral control circuit 2 and the independent control circuit for a corresponding section according to a mode set by the section mode setting module 3.

When the section mode configuration module 4 configures a section to work in a push-broom mode, the row-selection control circuit 21 is instructed to sequentially select image sensitive unit rows in the section for connection, configure all the image sensitive unit rows in the section to have the same scanning frequency, and choose an output circuit of one independent control area in the section to be the output circuit for the entire section. When the section mode configuration module 4 configures a section to work in a push-frame mode, the row-selection control circuit 21 is instructed to simultaneously select all image sensitive unit rows in the section for connection, configure all the image sensitive unit rows in the section to have the same sampling time and frequency, and choose an output circuit of one independent control area in the section to be the output circuit for the entire section. When the section mode configuration module 4 configures a section to work in a disabled mode, all image sensitive unit rows in the section of independent control area are no longer selected for connection by a row-selection control circuit 21.

Furthermore, the multimode CMOS image sensor also comprises a damaged image unit detection module 5 connected to signal output ports of the independent control areas, and a damaged image unit report module 6 connected to the damaged image unit detection module 5. The damaged image unit detection module 5 is for detecting whether an image sensitive unit array contains a damaged image sensitive unit and detecting a location of the damaged image sensitive unit in the image sensitive unit array according to data outputted from the sensor. The damaged image unit detection module 5 sends the detection result to the damaged image unit report module 6, and the damaged image unit report module 6 is for reporting that the image sensitive unit array contains a damaged image sensitive unit and reporting the location of the damaged image sensitive unit to an operator, for example, reporting to the operator by popping-up a textbox on a display screen of an operation terminal. After the operator gets to know the location of the damaged image sensitive unit in the image sensitive unit array, he/she may instruct the section mode setting module 3 to re-divide the image sensitive unit array, allocate the independent control area with the damaged image sensitive unit into a separate section and configure this section to be in a disabled mode. When the section mode configuration module 4 receives an instruction to configure a section to be in a disabled mode, it would no longer instruct the row-selection control circuit 21 to select the image sensitive unit rows in this disabled section.

In a preferred embodiment, according to data amount of image collecting in a push-broom mode and a push-frame mode, the image sensitive unit array is divided into a first section, a second section and a third section along a column direction, i.e., n=3, and the imaging time and output of each section can be independently selected and controlled. This kind of sensor has a push-broom mode, a push-frame mode and a disabled mode. In a push-broom mode, one, two or three sections from the first, second and third sections are selected as scanners to perform push-broom, every row in the selected section acquires one image, and the scanning frequency is consistent. In a push-frame mode, one section from the first, second and third sections is used as an overall scanner, one section acquires one image, the image sensitive unit array has the same sensitive time, and the acquired signal is outputted line by line. In a disabled mode, an independent control area with a damaged image sensitive unit from the image sensitive unit array is selected to be disabled. The first, second and third sections may work independently or simultaneously, the first and third sections mainly work in a push-broom mode, and the second section mainly works in a push-frame mode. The sensor of the present invention can re-divide sections and configure modes when required, and therefore is very flexible to use and can be widely used. The first section and the third section are equivalent to two line array sensors in the same imaging plane, which are spaced apart at a predetermined distance, and sensors arranged in such a manner are especially suitable for detecting a moving target. The technical scheme of the present invention makes a multi-sensor detection system on the same platform for moving target detection more easily implemented, with more accurate structural arrangement dimensions.

When the section mode configuration module 4 configures a section to work in a push-broom mode, the row-selection control circuit 21 is instructed to select certain independent control area(s) to be in a push-broom mode, configure all the image sensitive unit rows in the selected section to have the same scanning frequency, and choose an output circuit of one independent control area in the section to be the output circuit for the entire section. For example, one, two or three sections from the first, second and third sections are selected as scanners to perform push-broom, every row in a corresponding scanner acquires one image, and this imaging mode can produce a sequence of images with fixed pixel difference. When the section mode configuration module 4 configures a section to work in a push-frame mode, the row-selection control circuit 21 is instructed to select a certain independent control area to be in a push-frame mode, configure all the image sensitive unit rows in the selected section to have the same sampling time and frequency, and choose an output circuit of one independent control area in the section to be the output circuit for the entire section. For example, one section from the first, second and third sections is used as an overall scanner to perform push-frame, additionally, another section may be selected as a second overall scanner to perform push-frame, again additionally, yet another section may be selected as a third overall scanner. One section acquires one image, and the acquired signal is outputted line by line.

The first, second and third sections may work independently or simultaneously. The head section and the rear section mainly work in a push-broom mode, and the body section mainly works in a push-frame mode.

Figure 5:
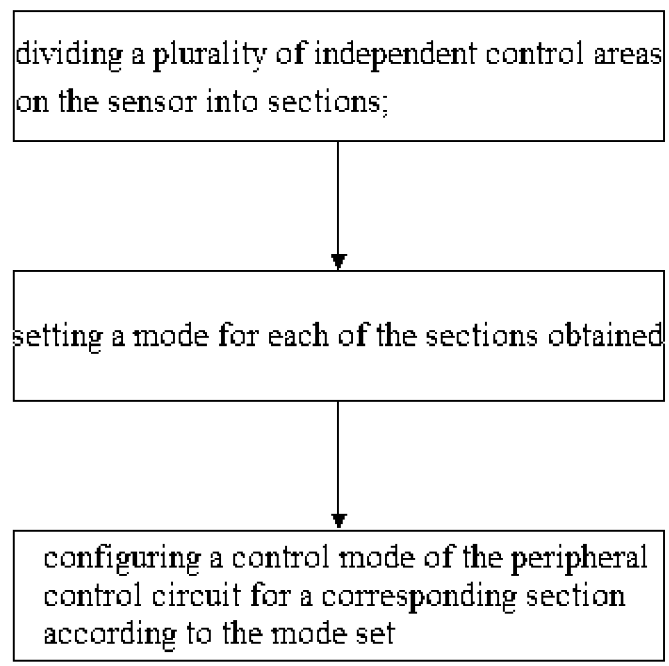
FIG. 5 is a flow chart of a control method for a multimode CMOS image sensor according to the present invention.

As shown in FIG. 5, a control method for the aforementioned multimode CMOS image sensor comprises the following steps:
dividing a plurality of independent control areas on the sensor into sections;
setting a mode for each of the sections obtained, wherein the mode may be set to be a push-broom mode, a push-frame mode or a disabled mode;
configuring a control mode of the peripheral control circuit for a corresponding section according to the mode set.

Preferably, before any section is set to be in the disabled mode, the method comprises the following steps:
detecting whether the respective sections contain a damaged image sensitive unit according to image signal outputted from the respective sections, and determining the location of the damaged image sensitive unit if the damaged image sensitive unit exists;
when a damaged image sensitive unit is detected, reporting the existence of a damaged image sensitive unit and the location thereof.

Apparently, a person skilled in the art may make various changes and modifications to the present invention without departing from the spirit and scope of the present invention. Thus, if such changes and modifications made to the present invention belong to the scope of the Claims of the present invention and its equivalent technology, these changes and modifications are intended to be included within the present invention.

The invention claimed is:

1. A multimode CMOS image sensor, characterized in comprising:
   an independent control area group, in which each independent control area has an image sensitive unit row and an independent control circuit;
   a peripheral control circuit, for performing row-selection driving on the image sensitive unit rows and providing working time-sequence to the image sensitive unit rows;
   a section mode setting module, for performing section dividing on the independent control areas and performing mode setting on the divided sections;
   a section mode configuration module connected to the section mode setting module, the peripheral control circuit and the independent control circuits, for configuring a control mode of the peripheral control circuit and the independent control circuit for a corresponding section according to a mode set by the section mode setting module,
   when the section mode configuration module configures a section to work in a push-broom mode, a row-selection control circuit is instructed to sequentially select image sensitive unit rows in the section for connection, configure all the image sensitive unit rows in the section to have the same scanning frequency, and choose an output circuit of one independent control area in the section to be the output circuit for the entire section.

2. The multimode CMOS image sensor of claim 1, characterized in that, the mode is any one of a push-broom mode, a push-frame mode and a disabled mode.

3. The multimode CMOS image sensor of claim 1, characterized in further comprising a damaged image unit detection module connected to signal output ports of the independent control areas, and a damaged image unit report module connected to the damaged image unit detection module, wherein,
   the damaged image unit detection module is for detecting whether an image sensitive unit array contains a damaged image sensitive unit and detecting a location of the damaged image sensitive unit in the image sensitive unit array according to data outputted from the sensor;
   the damaged image unit report module is for reporting that the image sensitive unit array contains a damaged image sensitive unit and reporting the location of the damaged image sensitive unit to an operator.

4. The multimode CMOS image sensor of claim 1, characterized in that, when the section mode configuration module configures a section to work in a push-frame mode, a row-selection control circuit is instructed to simultaneously select all image sensitive unit rows in the section for connection, configure all the image sensitive unit rows in the section to have the same sampling time and frequency, and choose an output circuit of one independent control area in the section to be the output circuit for the entire section.

5. The multimode CMOS image sensor of claim 1, characterized in that, when the section mode configuration module configures a section to work in a disabled mode, all image sensitive unit rows in the section of independent control area are no longer selected for connection by a row-selection control circuit.

6. The multimode CMOS image sensor of claim 1, characterized in that, the independent control area group is divided into a first section, a second section and a third section along a column direction, wherein, the first and third sections work in a push-broom mode, and the second section works in a push-frame mode.

7. A control method for the multimode CMOS image sensor of any one of the aforementioned claims, characterized in comprising the steps of:
   dividing an independent control area group of the sensor into sections;
   setting a mode for each of the sections obtained;
   configuring a control mode of the peripheral control circuit for a corresponding section according to the mode set.

8. The control method of claim 7, characterized in that, the mode is any one of a push-broom mode, a push-frame mode and a disabled mode.

9. The control method of claim 8, characterized in that, before any section is set to be in the disabled mode, the method comprises the steps of:
   detecting whether the respective sections contain a damaged image sensitive unit according to image signal outputted from the respective sections, and determining the location of the damaged image sensitive unit if the damaged image sensitive unit exists;
   when a damaged image sensitive unit is detected, reporting the existence of a damaged image sensitive unit and the location thereof.

* * * * *